United States Patent
Comiskey, Jr.

(10) Patent No.: US 7,457,137 B2
(45) Date of Patent: Nov. 25, 2008

(54) OUTPUT SENSOR CIRCUIT FOR POWER SUPPLY REGULATION WITH MAIN AND SWITCHED OUTPUTS

(75) Inventor: Donald V. Comiskey, Jr., West Chicago, IL (US)

(73) Assignee: Texas Instruments Incorporated, Dallas, TX (US)

( * ) Notice: Subject to any disclaimer, the term of this patent is extended or adjusted under 35 U.S.C. 154(b) by 253 days.

(21) Appl. No.: 10/962,938

(22) Filed: Oct. 12, 2004

(65) Prior Publication Data

US 2006/0077699 A1    Apr. 13, 2006

(51) Int. Cl.
*H02M 3/335*    (2006.01)
(52) U.S. Cl. .................. 363/21.06; 363/89; 363/97; 323/284

(58) Field of Classification Search ............. 323/267, 323/284, 351; 363/21.06, 21.14, 89, 95, 363/97, 98
See application file for complete search history.

(56) References Cited

U.S. PATENT DOCUMENTS 6,946,820 B2 *  9/2005  Ishii et al. .................. 323/222
7,023,187 B2 *  4/2006  Shearon et al. ............. 323/266

* cited by examiner

*Primary Examiner*—Jeffrey L Sterrett
(74) *Attorney, Agent, or Firm*—Warren L. Franz; Wade J. Brady, III; Frederick J. Telecky, Jr.

(57) ABSTRACT

A sense circuit is provided connected to a control loop of a circuit having an output. The sense circuit receives a signal derived from the output of the circuit and provides a controlling signal to the control loop. In one embodiment, the sense circuit is connected to the output of a switching power supply and monitors the switched output to ensure that the main output of the power supply is kept within predetermined thresholds. The sense circuit includes first and second comparators comparing the switched output, in one embodiment, to a reference voltage, on one hand, and comparing the main output signal to the reference voltage, on the other hand.

12 Claims, 6 Drawing Sheets

OUTPUT SENSOR CIRCUIT FOR POWER SUPPLY REGULATION WITH MAIN AND SWITCHED OUTPUTS

BACKGROUND OF THE INVENTION

1. Field of the Invention

The present invention relates generally to an output sensing circuit for a circuit having a control loop, and in particular to an output sensor for a power supply having a main output and a switched output.

2. Description of the Related Art

For electrical power supplies, a standard configuration is that the power supply circuit has a main power output and a switched power output which is derived from the main power output. It is typically a problem to be able to remotely sense and regulate either of the outputs at any given time with a single remote sensing connection. For example, if the remote sensing connection is connected to the switched output and the switched output is either delayed in turning on at power up or is commanded to be turned off at any time by a logical signal, the feedback loop of the power supply will enter an open loop condition and cause the main output voltage to increase uncontrollably in magnitude, thereby causing possible damage to the load circuitry connected to the main output and possibly also to the power supply circuitry itself. On the other hand, if the remote sensing connection is connected to the main power output while the load circuit is connected to the switched output, the voltage at the switched output will not be tightly regulated due to a voltage drop associated with an electrical device, such as a MOSFET (Metal Oxide Semiconductor Field Effect Transistor) which is used to provide the switched output. This voltage drop, which is dependent on the load current being drawn from the switched output, may have adverse effects on the load circuitry connected to the switched output.

Remote sensing is the term applied to the practice of closing the feedback loop of the power supply as close to the load as possible. The supply output voltage is sensed remotely. To make certain the feedback is always closed, a low ohmic value resistor is typically connected between the power supply output and the remote sensing input. If the remote sensing feature is utilized, the user connects the remote sense input to the output at the point where the tightest voltage regulation is to be maintained. This remote sense connection is much lower in resistance than the default resistance connecting the two nodes.

A problem with this approach is the inability of the remote sensing connection to withstand an inadvertent connection to the output return of the power supply. If this situation occurs, the low ohm resistor becomes connected across the entire power supply output and heavy current flows. The resistor usually fuses open due to excessive power dissipation. The power supply output will also uncontrollably increase-in magnitude due to the inadvertent connection.

SUMMARY OF THE INVENTION

The present invention provides, in one embodiment, a remote sensing circuit which enables a remote sensing connection to be made at any time to either the main output or to the switched output of a power supply in order to regulate the desired output. The invention utilizes an input buffering function, and voltage monitoring is provided to control if and when the remote sensing connection should be recognized. This prevents the possible loss of control of the outputs and also enables the remote sensing connection to be inadvertently connected to the output return of the power supply without causing component damage.

The invention is not limited to use on power supplies, however, and may find utility in a circuit which has an output and a control loop. The sensing circuit monitors a signal derived from the output and provides a sense control signal to the control loop depending on the signal derived from the output.

DETAILED DESCRIPTION OF THE PREFERRED EMBODIMENTS

Figure 1A:
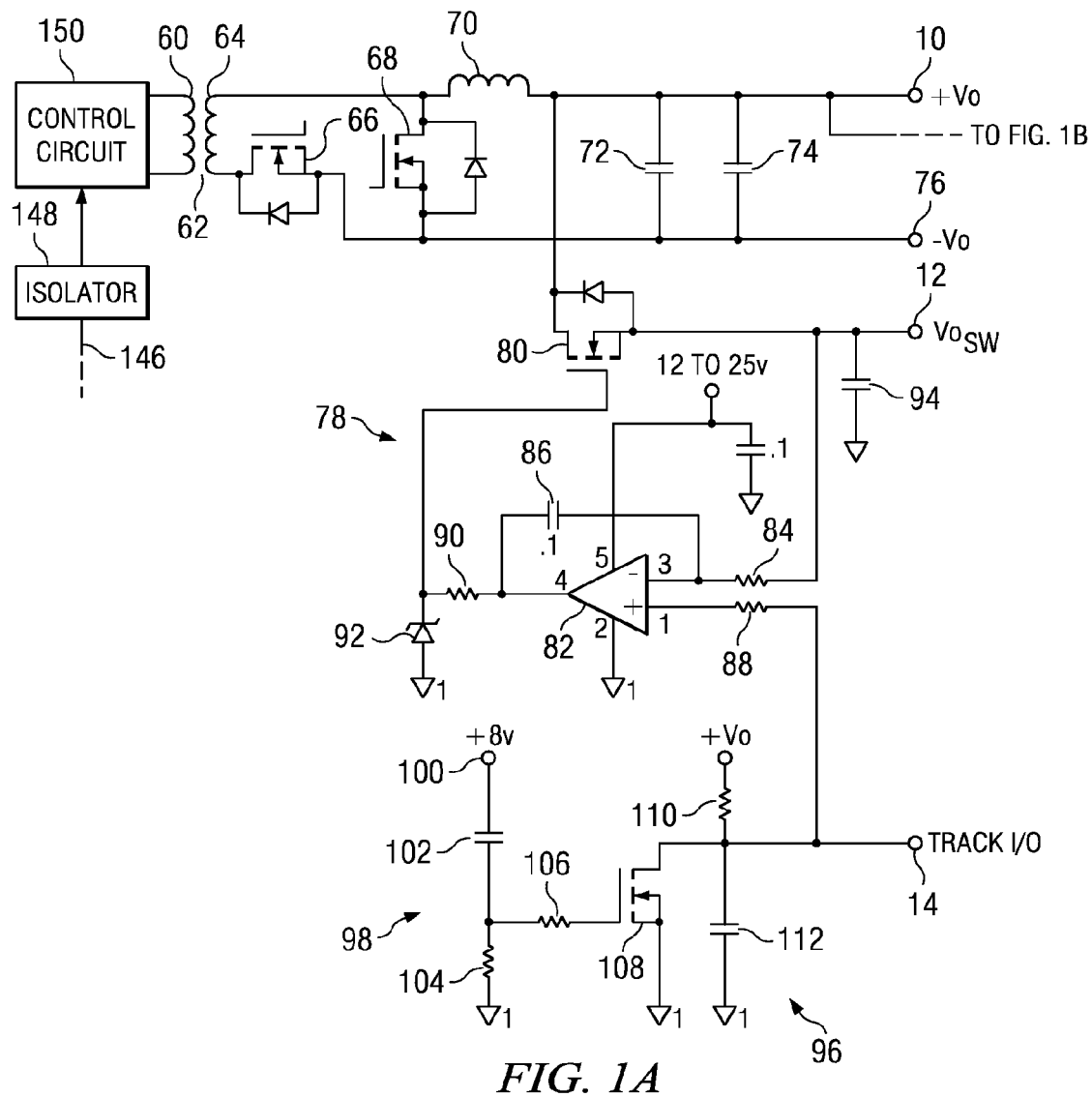
FIG. 1 is a circuit diagram of a power supply having a switched output and a tracking input and output and including a remote sensing circuit according to the principles of the present invention.

The problem of remote sensing of the switched and main power outputs of a power supply have been addressed in the past by utilization of an arbitrary delay circuit that allows the remote sensing connection to be electrically switched from the main output to the switched output after a certain period of time. Other remote sensing implementations exhibit problems caused by the remote sensing connection being electrically switched from the main output to the switched output at the same instant that the switched output is commanded to be on. Both of these solutions operate regardless of the magnitude of the voltage at the sensing point. The present invention eliminates the dependence on arbitrary time delays and does not permit the remote sensing connection to be made unless the voltage at the sensing point is within acceptable limits.

An intelligent remote sensing circuit is provided according to the preferred embodiment which utilizes a versatile and robust solution for power supply designs, including those having a switched power output. This also prevents the possibility of uncontrolled increases in the magnitude of the power supply outputs and prevents the possibility of component damage due to inadvertent connections. The remote sensing circuit described in the following is automatically responsive to the sensed connection at all times and its activation is not dependent upon other external events.

In the following figure descriptions, voltages or signals which appear at different locations in the circuit may be provided with different reference characters even where the voltages or signals are the same for aiding in understanding the drawing descriptions.

Figure 1B:
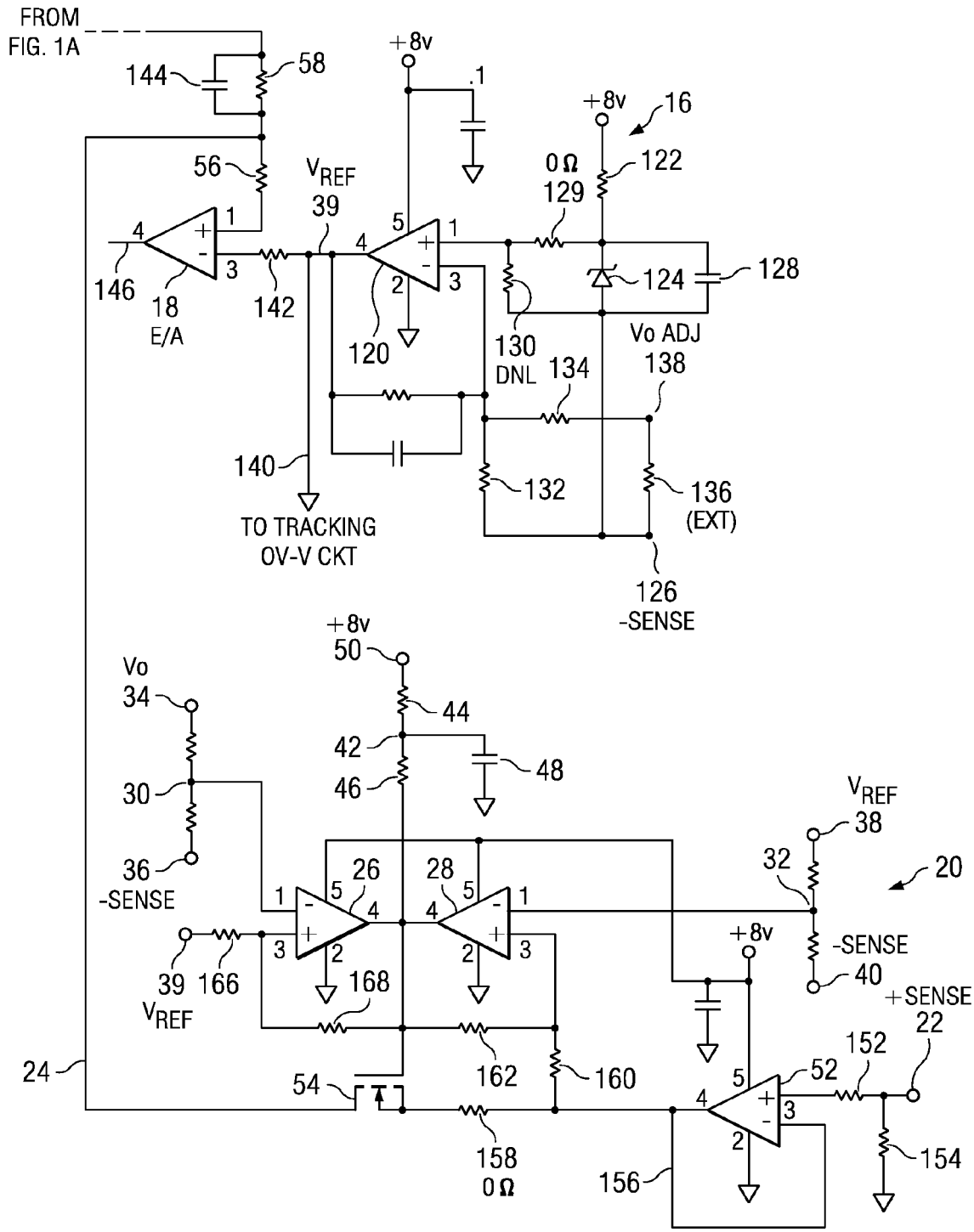

Turning now to FIG. 1, a power supply output 10 is shown having a switched output 12 and a tracking input and output 14. An adjustable reference value circuit 16 and an error amplifier 18 circuit are also provided by which the power supply is regulated. According to the present invention, a remote sensing circuit 20 is provided having an input connection at a positive sense connection 22 and an output 24 connected into the error amplifier circuit 18. The remote sensing circuit 20 includes mirror connected comparators 26 and 28 which each have the inverting input connected to voltage dividers 30 and 32. In the first instance, the voltage divider 30 is connected across the supply voltage 34 and a negative sense voltage 36. In the second comparator 28, the inverting input is connected to the voltage divider 32 that spans the $V_{REF}$ voltage 38 that is generated at the output 39 of the adjustable reference circuit 16 to the negative sense signal 40. The non-inverting input of the comparator 26 receives the reference voltage 39, while the non-inverting input of the comparator 28 receives the buffered +Sense signal 22. The outputs of the mirror connected comparators 26 and 28 are connected to a pull-up network 42 comprised of two resistors 44 and 46 and a capacitor 48 connected to a fixed voltage 50. A positive sense 22 signal is provided through a buffering operational amplifier 52 to the source-drain connection of a signal field effect transistor 54. The gate of the signal field effect transistor 54 is controlled by the mirror connected comparators 26 and 28.

The output 24 of this remote sensing circuit 20 is connected between feedback resistors 56 and 58 which connect to the non-inverting input of the error amplifier 18. The inverting input thereof is connected to the reference voltage $V_{REF}$ 39 from the adjustable reference circuit 16. A sensing of the switched and main power outputs 12 and 10 is thereby possible utilizing the circuit of the present invention.

In further detail, FIG. 1 shows a power supply in schematic representation. The power supply of the present invention is a synchronous rectified power supply, but the principals of the present invention can be applied to other types of power supplies such as a linear power supply. The remote sense function according to the present invention is not limited to power supplies, but may be applied to virtually any circuit that uses a control loop.

An input circuit is provided having a power input and a control input. The input circuit is connected to a primary winding 60 of a transformer 62. The transformer 62 also has a secondary winding 64 inductively coupled to the primary winding.

In the illustrated example, circuitry that drives the transformer 62 is shown generally. The details of the circuitry are well understood by those of skill in this art so that the transformer primary winding 60 provides isolated power transfer to the secondary winding 64. Connected to the transformer winding are a pair of FETs 66 and 68 that are shown generally but in this example are connected for synchronous rectification, as will be readily understood by those of skill in the art. Following the synchronous rectifier FETs 66 and 68, an inductor 70 and a pair of capacitors 72 and 74 are connected to provide an output filter. It is of course possible that the filter may be differently constructed, including replacing the pair of parallel connected capacitors 72 and 74 with a single capacitor. The power supply output is provided across the capacitors as a +$V_o$ 10, which is the main output voltage and -$V_o$ 76 which is circuit ground and serves as a return for the main output voltage. This circuit provides a synchronous forward converter power supply.

As an adjunct to the power supply, a switched output 12 with a track input/output 14 is provided. The switched output circuit 78 includes a power field effect transistor (FET) 80 connected from the main output voltage 10 to the switched output 12, shown in the circuit as $V_{osw}$. The gate of the power FET 80 is connected at the output of an operational amplifier 82 which monitors the switched output voltage 12. In particular, the switched output voltage 12 is connected to the inverting input of the operational amplifier 82 through a resistor 84. The inverting input of the operational amplifier 82 is also connected through a capacitor 86 to the output of the operational amplifier 82 in a feedback loop. The presence of the capacitor 86 in the feedback loop causes the operational amplifier 82 to operate as an integrator. The non-inverting input of the operational amplifier 82 is connected through a resistor 88 to the track input/output pin 14. The output of the operational amplifier 82 is connected through a resistor 90 to the gate of the power FET 80. A zener diode 92 is connected between the gate of the power FET 80 and ground to serve as a clamp to protect the gate of the power FET 80 from high voltages. A filter capacitor 94 is connected between the switched output voltage 12 and ground.

The track input/output 14 connection is driven by a track circuit 96 including a differentiator circuit 98 connected between a positive voltage 100 and ground and including a capacitor 102 and resistor 104. The differentiator circuit 98 has a time constant which, in one example, is in the range of between 15 and 20 milliseconds. Connected between the capacitor 102 and the resistor 104 is a resistor 106 that connects to a gate of a signal field effect transistor 108. The signal field effect transistor 108 is connected from the track input/output connection 14 to ground. The track input/output connection 14 is also connected between the main output voltage and ground by a resistor 110 and capacitor 112.

In operation, if the track input/output pin 14 is connected to ground then the operational amplifier 82 turns off the power FET 80 and the switched output voltage 12 is turned off. Thus, a user of the present circuit may use the track input/output connection 14 to turn off and on the switched output voltage 12.

If the track input/output lead 14 is not grounded, then the operational amplifier 82 causes the switched output 12 to eventually mimic the main output voltage 10. The power FET 80 is turned fully on after being initially controlled through its linear region.

If the power supply is turned on, the main power output 10 abruptly rises to the set level. If the track input/output connection 14 is not grounded, the switched output voltage 12 experiences a delay equivalent to approximately the time constant of the differentiator circuit 98 as the result of a, for example, 15 to 20 millisecond pulse, applied to the gate of the signal field effect transistor 108, after which the switched output voltage 12 experiences an exponential increase in voltage to approximately the level of the main output voltage 10.

If the power supply is up and running and the user connects the track input/output lead 14 to ground, the switched output 12 is turned off. If the user subsequently releases the track input/output lead 14 from ground while the power supply is still up and running, the exponential rise in the switched output voltage 12 begins immediately without the delay caused by the time constant of the differentiator 98, in that the differentiator circuit 98 is only activated upon initial power up of the power supply.

The user of the present circuit may use the track input/output lead 14 to provide their own time delay by adding a separate circuit to the track input/output. For example, longer turn-on delays may be imposed on the circuit through a connection to the track input/output. Upon turn on of the power supply, the longer delay would effectively mask the shorter delay provided by the differentiator circuit 98.

The present circuit includes an adjustable reference circuit 16 to permit adjusting of the main output voltage 10 of the power supply. For example, the main power supply output 10 may be set to, for example, 3.3 volts as is common for driving computer circuits. A reference voltage is generated as a result of the illustrated circuit. The reference voltage could come from a variety of sources, including other circuits in the system, or even from a constant voltage source such as a battery. However, in the illustrated embodiment, it is generated by the adjustable reference voltage circuit 16. The reference voltage 39 is generated by an operational amplifier 120 and associated circuitry. The operational amplifier 120 has its non-inverting input fed through a fixed voltage connected to a resistor 122 which is in turn connected across a reference diode 124 to a –Sense connection 126. A filter capacitor 128 is connected across the reference diode 124. A predetermined voltage is generated across the reference diode. In one example, the voltage is 1.225 volts. Shown in the drawing are operational resistors 128 and 130 which in the preferred embodiment are short circuited and open circuited, respectively. However, adding resistance values connected at these locations allows for optimum flexibility in the present circuit.

The inverting input of the operational amplifier 120 is connected to the junction of two resistors 132 and 134 having top and bottom connections extending externally of the circuit for connection to an external resistor 136. The external connections are denoted in the present drawing as $V_{out\ adjust}$ (the $V_{oadj}$) 138 and –Sense 126. If no resistance is connected across the external connections 138 and 126, then the reference voltage is at its minimum level. Conversely, if the external connections 138 and 126 are shorted to one another, then the reference voltage level is at its maximum. In actual use, it is contemplated that a user will connect a resistance across these external connections 138 and 126 to set the reference voltage at the desired level. A low ohm resistor is connected from the –Sense connection to the $-V_{out}$ or circuit ground connection. The –Sense pin is thus nearly the same potential as the $-V_{out}$ voltage. The reference circuit 16 is referenced to the –Sense pin.

The present circuit uses a differential remote sensing with both a positive and negative sense output connection, as will be described in further detailed hereinafter. The operational amplifier 120 of the reference circuit tries to get its inverting input to equal the voltage being applied across the non-inverting input since it is connected as a non-inverting amplifier. The gain of the amplifier is determined according to the formula $$Gain = 1 + (R_f/R_{in})$$

where $R_f$ equals the feedback resistance, which is provided in the feedback loop connected from the inverting input to the output and $R_{in}$ is the equivalent resistance applied from the inverting input to the –Sense pin. Using this formula, a user of the present power supply may set the external resistance to determine the voltage of the reference voltage, which will lie between the upper and lower limits permitted by the circuit.

A connection 140 from the output voltage of the operational amplifier 120 indicates that the reference voltage 39 can be used by other circuits as well, if desired. The reference voltage 39 is applied through a resistor 142 to the inverting input of the error amplifier 18. The non-inverting input of the error amplified 18 is connected from the main output voltage 10 through a parallel combination of the resistor 58 and capacitor 144 and then through the second resistor 56. The output 146 of the error amplifier 18, as will be understood of those of skill in this art, is typically connected through an isolator 148, such as an optocoupler across the isolation barrier of the transformer 62 and to a control circuit 150 on the primary side 60 of the transformer 62. The optocoupler 148 typically drives a pulse width controller and a field effect transistor on the primary side of the power supply and adjusts the duty cycle of the power train. Thus, the reference voltage 39 is provided to adjust the output voltage 10 of the power supply to the desired level.

An important feature of the present invention is the ability to provide remote sensing of either the main output voltage 10 or the switched output voltage 12. In this regard, a +Sense connection 22 is provided which is connected through a resistor 152 serving as a noise buffer to the non-inverting input of the operational amplifier 52. A high resistance resistor 154 is connected from the +Sense pin 22 to ground to keep the +Sense connection 22 from floating if the +Sense pin 22 is not connected and not being used. The high resistance resistor 154 does not provide a heavy load if the +Sense pin 22 is being used.

The operational amplifier 52 of the preferred embodiment is basically connected as a unity gain buffer. In particular, the inverting input of the operational amplifier 52 is connected in a feedback loop 156 to the output of the operational amplifier 52. The operational amplifier 52 provides a low impedance output and high impedance input so that the voltage applied at the +Sense pin 22 is essentially passed through to the output of the operational amplifier 52 and is a reflection of what is being sensed. The output of the operational amplifier 52 is connected through a resistor 158, which in one embodiment is a short circuit but which may be of a resistance value if desired, to a signal field effect transistor 54. The signal field effect transistor 54 is connected to the junction of the two resistors 56 and 58 which are connected from the main voltage output 10 of the power supply and the non-inverting input of the error amplifier 18.

The gate of the signal field effect transistor 54 is driven by the pair of comparators 26 and 28. In particular, the right comparator 28 has its inverting input connected to the voltage divider 32 which divides the voltages of, on one hand, the reference voltage 38 and on the other hand, the –Sense signal 40. The non-inverting input of the right comparator 28 is connected through a resistor 160 to the output of the unity gain buffer operational amplifier 52. A high resistance resistor 162 is connected from the non-inverting input to the output to provide hysterisis to prevent chatter in the circuit.

The voltage divider 32 is configured to set the inverting input of the right comparator 28 to a predetermined percentage below the reference voltage 38. In one example, the voltage divider 32 sets the inverting input to 15% below the reference voltage 38. In operation, if the +Sense input 22 is not connected to anything, then zero volts is applied to the non-inverting input of the comparator 28. This causes the inverting input to be higher than the non-inverting input and the output of the comparator 28 goes low. This low voltage is applied to the gate of the signal field effect transistor 54 and the signal field effect transistor 54 is not turned on. No connection is made to the error amplifier 18 because the voltage being sensed lies below the threshold level of 15% below the reference voltage 38. If the +Sense pin 22 is connected to a voltage which is lower than 15% below the reference voltage 38, this condition applies. The signal field effect transistor 54 is only turned on when the plus +Sense pin 22 receives a voltage which is over the threshold of 15% below the reference voltage 38. Otherwise, the signal field effect transistor 54 is not turned on and the remote sense circuit 20 is kept out of the error amplifier operation. This threshold at 15% below the reference voltage 38 defines the lower threshold of a band of operation.

The left side comparator 26 of the remote sense circuit 20 is connected at its inverting input to a voltage divider 30 that is connected between the $V_{out}$ output voltage 34 and the –Sense pin 36. The resistance values of the resistors in the voltage divider 30 are chosen to effectively provide a predetermined percentage above the reference voltage 39 for the upper threshold. The non-inverting input of the left comparator 26 is connected through a resistor 166 to the reference voltage 39. As with the right comparator 28, a high resistance resistor 168 is connected from the non-inverting input to the output to provide hysterisis to prevent chatter in the circuit.

The fixed voltage 50 is connected through the first resistor 44 and second resistor 46 to the gate of the signal field effect transistor 54 under the control of the left and right comparators 26 and 28. A turn-on delay capacitor 48 is connected from the junction of the two resistors 44 and 46 to circuit ground. If the $V_{out}$ voltage 34 exceeds by 15% the reference voltage 38, 39, the signal field effect transistor 54 is turned off. When the signal field effect transistor 54 is turned off, the output voltage 10 is being regulated by default through the resistors 56 and 58 connected between the non-inverting input of the error amplifier 18 and the $V_{out}$ output 10. When the signal field effect transistor 54 is on, the voltage at the +Sense pin 22 is being regulated instead of the $V_{out}$ voltage 10.

The present remote sense circuit 20 ensures that there is never an open loop or uncontrolled loop condition occurring in the power supply. The remote sense circuit 20 always maintains control of the feedback loop 146 and controls what the feedback loop is doing. If the remote sense connection is above the upper threshold or below the lower threshold, then the output voltage 10 is monitored through the parallel connected capacitor 144 and resistor 58 feeding into the error amplifier 18. If the sensed voltage is between the two threshold levels, then the remote sense circuit 20 is connected to the error amplifier 18 and controls the voltage of the circuit.

In FIG. 2 is shown a commercial embodiment of the remote sensing circuit connected in a power supply. The mirror connected comparators 26 and 28 and the buffering operational amplifier 52 of the remote sensing circuit 20 are shown in the configuration similar to that shown in FIG. 1. Also shown are the switched output 12, tracking input/output 14, reference circuit 16, the switched output circuit 78 and the differentiator circuit 98, as well as other components discussed in the foregoing and some circuit portions for unrelated functions.

Figure 3:
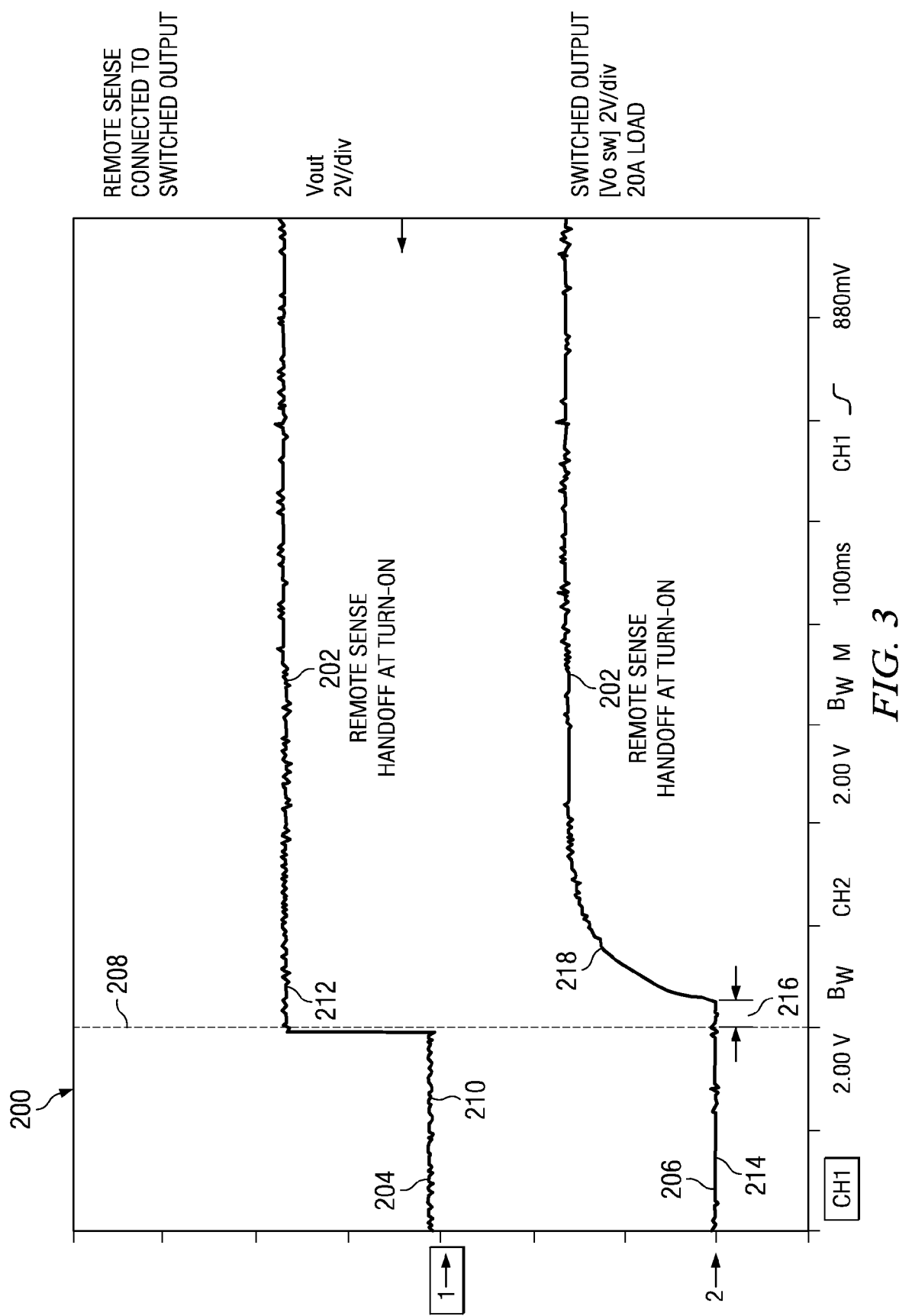
FIG. 3 is a graph showing remote sensing effects on a switched output of a power supply.

The graph 200 of FIG. 3 shows the remote sensing handoff 202 at the turn on of the remote sensing circuit. One of the traces 204 in the graph shows the output voltage at the main output of the power supply, while the other trace 206 shows the output voltage at the switched output of the power supply. The remote sensing handoff 202 is shown to occur at a point indicated by the arrows.

In FIG. 3 is shown the turn-on condition for the present circuit in which the remote sensing connection is connected to the switched output. In the top graph 204, the power is turned on by the power supply at 208 and raises from a circuit ground level 210 to the regulated output voltage 212. In the illustrated example, it is approximately 3.3 volts. The top graph shows the main output voltage 10 of the power supply. The switched output voltage 12 is shown in the lower graph 206. The switched output remains at circuit ground 214 for a time 216 after initialization of the main circuit power supply output. The delay 216 is determined by the time constant in the differentiator 98 of the track input/output circuit 96 as well as the turn-on delay of the signal field effect transistor in that circuit. Following the time delay 216, which here is approximately 15 to 20 milliseconds, the switched output begins an exponential rise 218 as the result of charging of the capacitor by the current through the resistor at the track input/output pin. When the switched output reaches a level within 15%, in this example, of the main output voltage, the remote sensing circuit switches on at 202 and begins regulation of the switched output voltage 12.

As a result of the on resistance of the power FET 80, the switched output voltage is, in this example, approximately 200 millivolts below the output voltage of the main output as can be seen by the slight change at 202. As a result, at the handoff to the remote sensing circuit, approximately a 200 millivolt increase occurs at the main output voltage. The voltage drop across the power FET is being taken into account in the switched output voltage. The output voltages illustrated in the FIG. 3 graphs illustrate tightly regulated output voltages, under controlled conditions.

Figure 4:
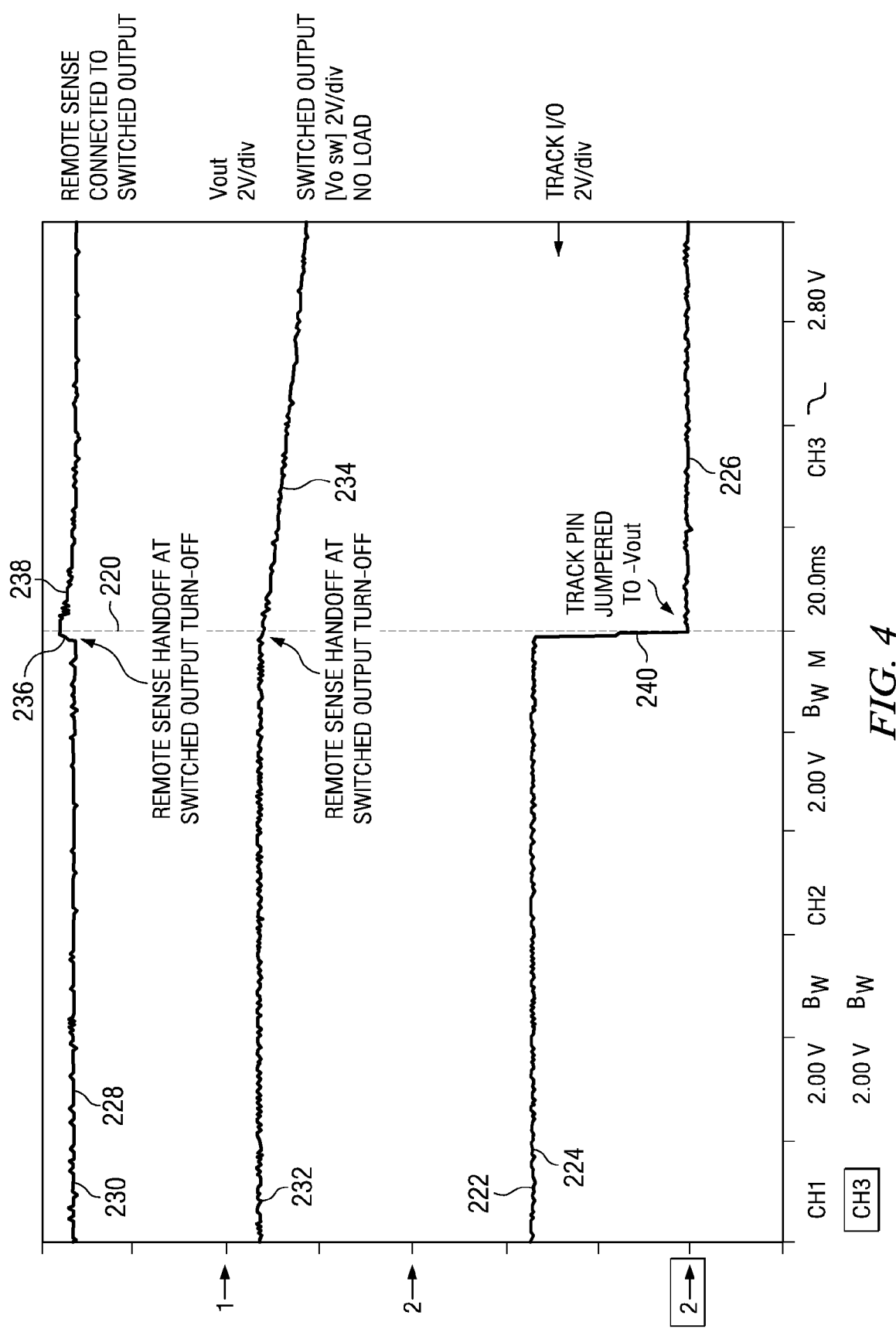
FIG. 4 is a graph showing the output signal for a remote sensed connection to a switched output with remote sense handoff at a switched output turnoff.
Figure 2A:
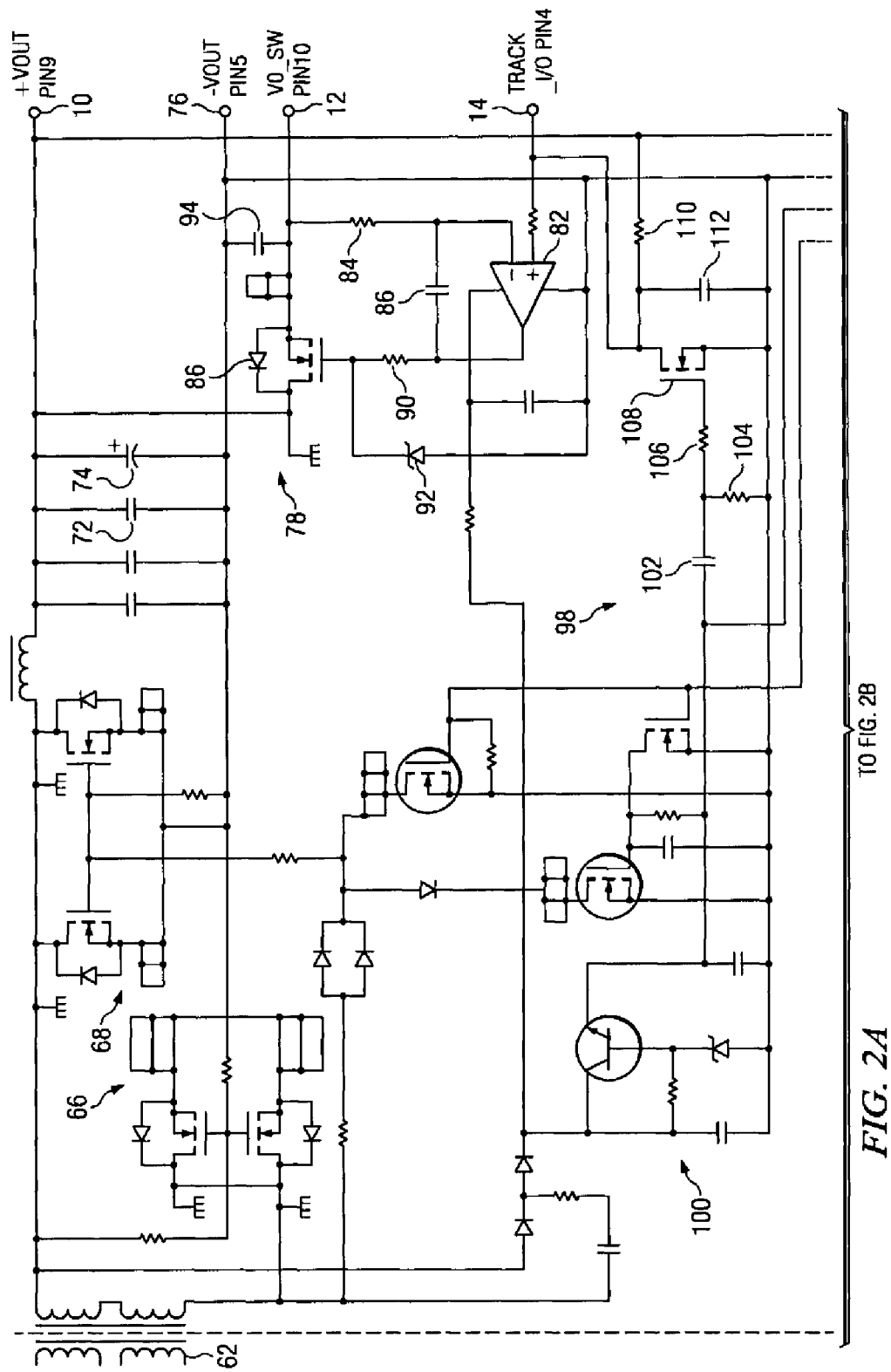
Figure 2B:
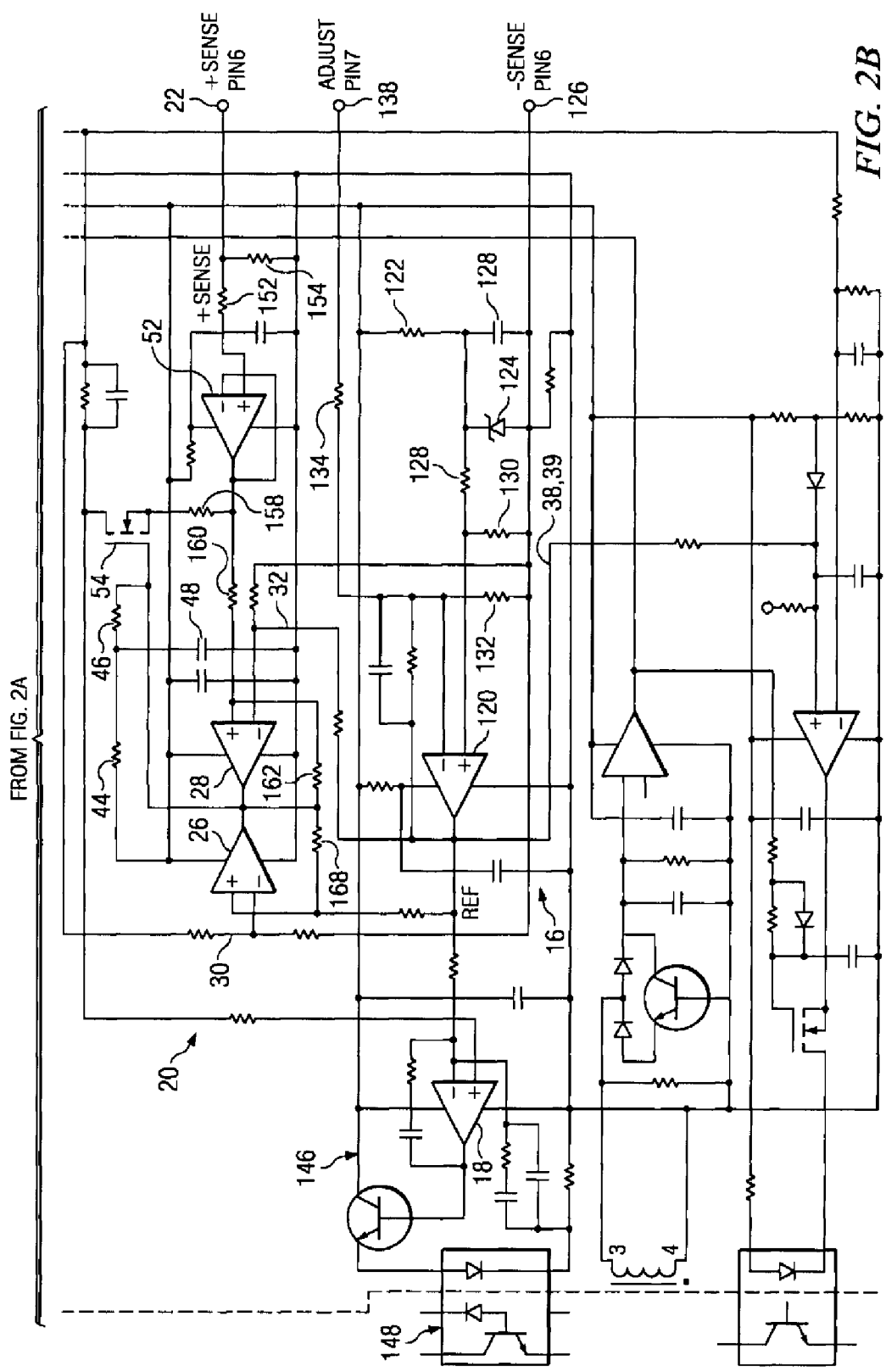

FIG. 4 illustrates the switched output voltage being turned off at 220, for example by connecting the track input/output pin to the circuit ground at $-V_{out}$. The voltage at the track input/output pin 14 is shown in the bottom graph 222 in FIG. 4 as it decreases from a 3.3 volt level 224, in this example, to circuit ground 226 at a particular moment. Prior to that moment, the main output voltage which is shown in the top graph 228 of FIG. 4 is being maintained at a voltage level 230 of approximately 3.3 volts plus approximately 200 millivolts due to the voltage drop across the power FET 80. The switched output voltage is maintained at 3.3 volts as shown in the middle graph 232 of FIG. 4. At the grounding of the track input/output pin at time 220, the switched output 232 begins to decay 234 toward circuit ground. The voltage decreases and begins coming down. As it does, the feedback loop attempts to push the output voltage 228 of the main output higher and higher as the switched output voltage falls below the reference voltage. This causes a sharp increase in the main output voltage 228 as indicated by the notch 236 appearing in the top graph 228. When the main output voltage reaches the upper threshold limit, which in the present example is 15% over the reference voltage, the remote sensing circuit 20 cuts off and the main output voltage 228 begins being regulated 238 back to its default setting. This prevents the feedback loop 146 from causing the power supply to be driven at its maximum on level and thereby prevents damage to the circuit being driven by the power supply and possibly the power supply itself.

Thus, the remote sensing circuit of the present embodiment provides control of the power supply output during the turn-on and turn-off conditions and prevents loss of control of the feedback loop. The present embodiment provides active monitoring at all times and controls the state of the remote sense output by monitoring when to turn on and when to turn off. The present circuit responds to the remote sense connection and only is connected if the sense voltage lies within the two established thresholds.

FIG. 4 shows the main 228 and switched voltage 232 outputs of the power supply when the remote sensing circuit is turned off. A small but brief increase 236 in the voltage is seen at the main power output, while at the switched power output 232 a gradual decline at the turnoff point is shown. The tracking input and output signal 222 as indicated in the third trace of FIG. 4 shows a sharp decrease 240 in the voltage as the track pin is jumpered to the $-V_{out}$ pin.

Thus, there is shown and described a remote sensing circuit for a dual output power supply having a main power output and a switched power output. The present circuit overcomes the disadvantages of the prior remote sensing circuits while increasing the safety and proper operation of the present circuit.

Figure 5:
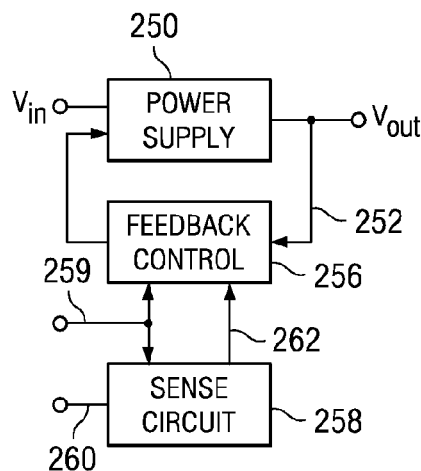
FIG. 5 is a function block diagram of the present sense circuit applied generally.

In FIG. 5 is shown a block diagram of the main components in a simplified example of the present remote sense circuit. In particular, a power remote sense circuit. In particular, a power supply 250 is provided with an input voltage and produces an output voltage. A feedback loop 252 permits control of the output voltage. The feedback loop 252 compares the output voltage to a reference signal 259 for use in the feedback control at 256. A sense circuit 258 has a sense input 260 and provides a sense signal 262 to the feedback loop 252 depending on the reference and sense signals 259 and 260.

Although other modifications and changes may be suggested by those skilled in the art, it is the intention of the inventor to embody within the patent warranted hereon all changes and modifications that reasonably and properly come within the scope of his contribution to the art.

I claim:

1. An output control for an electrical circuit having a control loop and a main output signal, comprising:
   a sense input connected to receive a signal derived from the main output signal;
   a sense circuit constructed to establish a first threshold of a difference between said main output signal and a reference signal, said sense circuit constructed to establish a second threshold of a difference between said reference signal and said signal derived from the main output signal, said sense circuit having a sense output for a sense output signal; and
   a connection from said sense output to the control loop, wherein said sense circuit includes:
   a first comparator connected to compare said reference signal to said signal derived from the main output signal; and
   a second comparator connected to compare the main output signal to said reference signal, and wherein said reference signal is connected to said first comparator through a first voltage divider, and said main output signal is connected to said second comparator through a second voltage divider.

2. An output control as claimed in claim 1, wherein said signal derived from the main output signal is a switched output signal.

3. An output control as claimed in claim 1, wherein said signal derived from the main output signal is a signal at a load.

4. An output control as claimed in claim 1, wherein said electrical circuit is a power supply and said sense circuit is constructed to control an output of the power supply.

5. An output control as claimed in claim 4, wherein said power supply includes a switched output, and said signal derived from the main output signal is the switched output.

6. An output control for an electrical circuit having a control loop and a main output signal, comprising:
   a sense input connected to receive a signal derived from the main output signal;
   a sense circuit constructed to establish a first threshold of a difference between said main output signal and a reference signal, said sense circuit constructed to establish a second threshold of a difference between said reference signal and said signal derived from the main output signal, said sense circuit having a sense output for a sense output signal; and
   a connection from said sense output to the control loop;
   wherein said sense circuit includes:
   a first voltage divider connected to said reference signal and a predetermined circuit signal;
   a buffer connected to said signal derived from the main output signal;
   a first comparator having a first input connected to said first voltage divider and a second input connected to an output of said buffer;
   a second voltage divider connected to the main output signal and to said predetermined circuit signal;
   a second comparator having a first input connected to said second voltage divider and a second input connected to said reference signal; and
   a switch connected between said output of said buffer and the control loop, said switch having a switch control connected to outputs of said first and second comparators.

7. An output control as claimed in claim 6, wherein said switch is a field effect transistor and said switch control is a gate of said field effect transistor.

8. A switching power supply with a sense circuit, comprising:
   a power regulating circuit having a main power output and a control input;
   a switching circuit connected to said main power output and having a switched output and a tracking input, said switching circuit providing a switched output signal dependent upon said tracking input;
   a reference circuit connected to generate a reference signal;
   an adjustable reference circuit extension of said reference circuit and operable to adjust said reference voltage;
   a control loop connected to compare said main power output to said reference signal; and
   a sense circuit having an input connected to receive a signal derived from said main power output, said sense circuit establishing at least one threshold, said sense circuit having a sense output connected to said control loop, said sense output being dependent on said threshold being exceeded, said sense circuit being connected and operable to compare said reference voltage to said output voltage of said power regulating circuit, wherein said sense circuit includes first and second comparators connected with outputs of said comparators in common.

9. A switching power supply as claimed in claim 8, wherein said power regulating circuit is a rectified power supply.

10. A power supply as claimed in claim 9, wherein said rectified power supply is a synchronous forward converter.

11. A power supply as claimed in claim 9, wherein said rectified power supply includes a feedback connection, said sense circuit having an output connected to said feedback connection.

12. A sense circuit for a switching power supply having a main output signal and a switched output and a control loop with a reference signal, comprising:
   a sense input connected to receive a signal derived from the main output signal;
   a sense circuit constructed to establish a first threshold of a difference between said main output signal and the reference signal, said sense circuit constructed to establish a second threshold of a difference between said reference signal and said signal derived from the main output signal, said sense circuit having a sense output for a sense output signal;
   a connection from said sense output to the control loop;
   said sense circuit including:
   a first voltage divider connected to said reference signal and a predetermined circuit signal;
   a buffer connected to said signal derived from the main output signal;
   a first comparator having a first input connected to said first voltage divider and a second input connected to an output of said buffer;
   a second voltage divider connected to the main output signal and to said predetermined circuit signal;
   a second comparator having a first input connected to said second voltage divider and a second input connected to said reference signal; and
   a switch connected between said output of said buffer and the control loop, said switch having a switch control connected to outputs of said first and second comparators, said switch being a field effect transistor and said switch control being a gate of said field effect transistor.

* * * * *

UNITED STATES PATENT AND TRADEMARK OFFICE
CERTIFICATE OF CORRECTION

| | | |
|---|---|---|
| PATENT NO. | : 7,457,137 B2 | Page 1 of 3 |
| APPLICATION NO. | : 10/962938 | |
| DATED | : November 25, 2008 | |
| INVENTOR(S) | : Donald V. Comiskey, Jr. | |

Figure 2A:
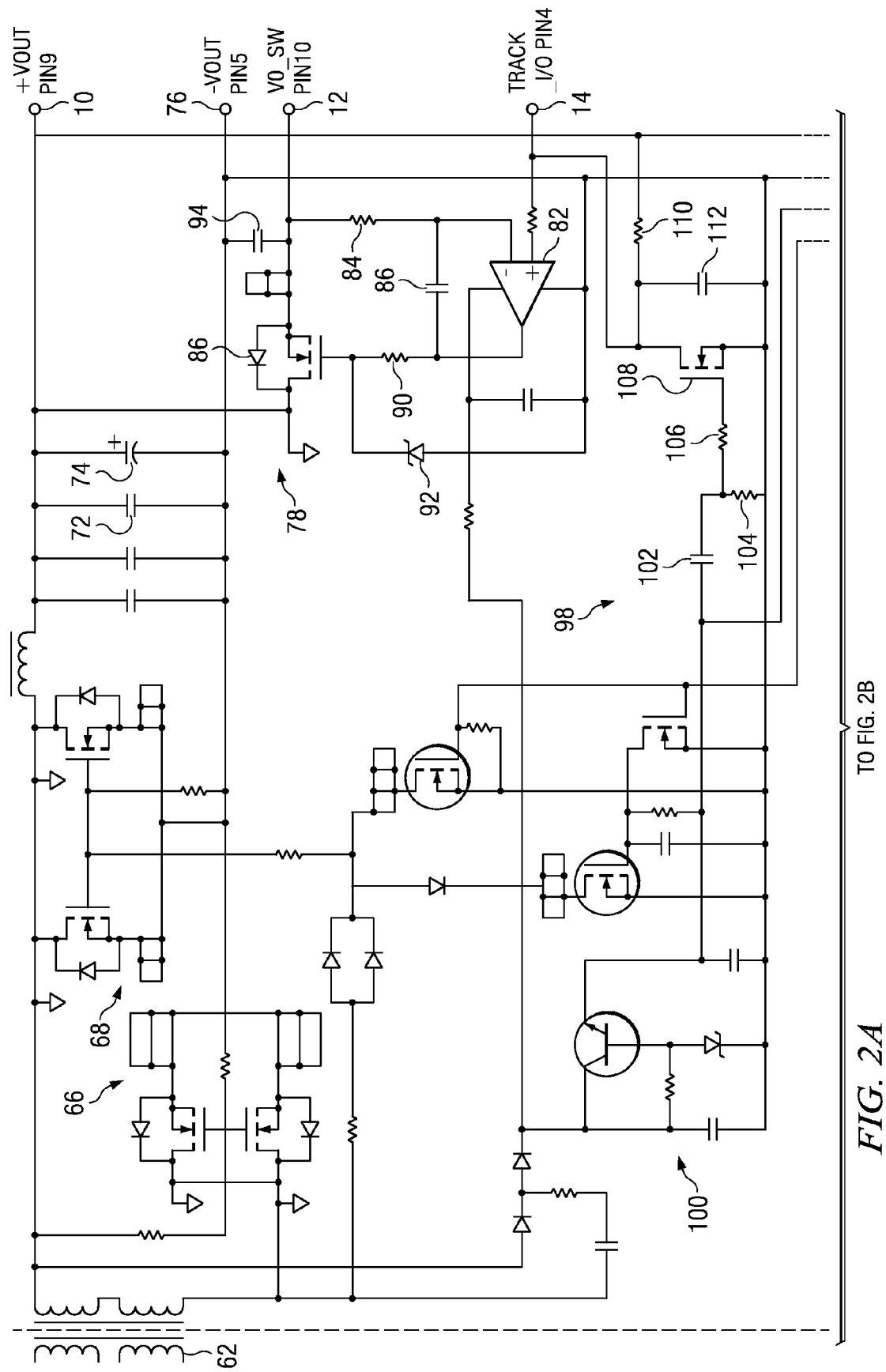
FIG. 2 is a circuit diagram showing the sensing circuit of the present invention in a commercial embodiment of a power supply.
Figure 2B:
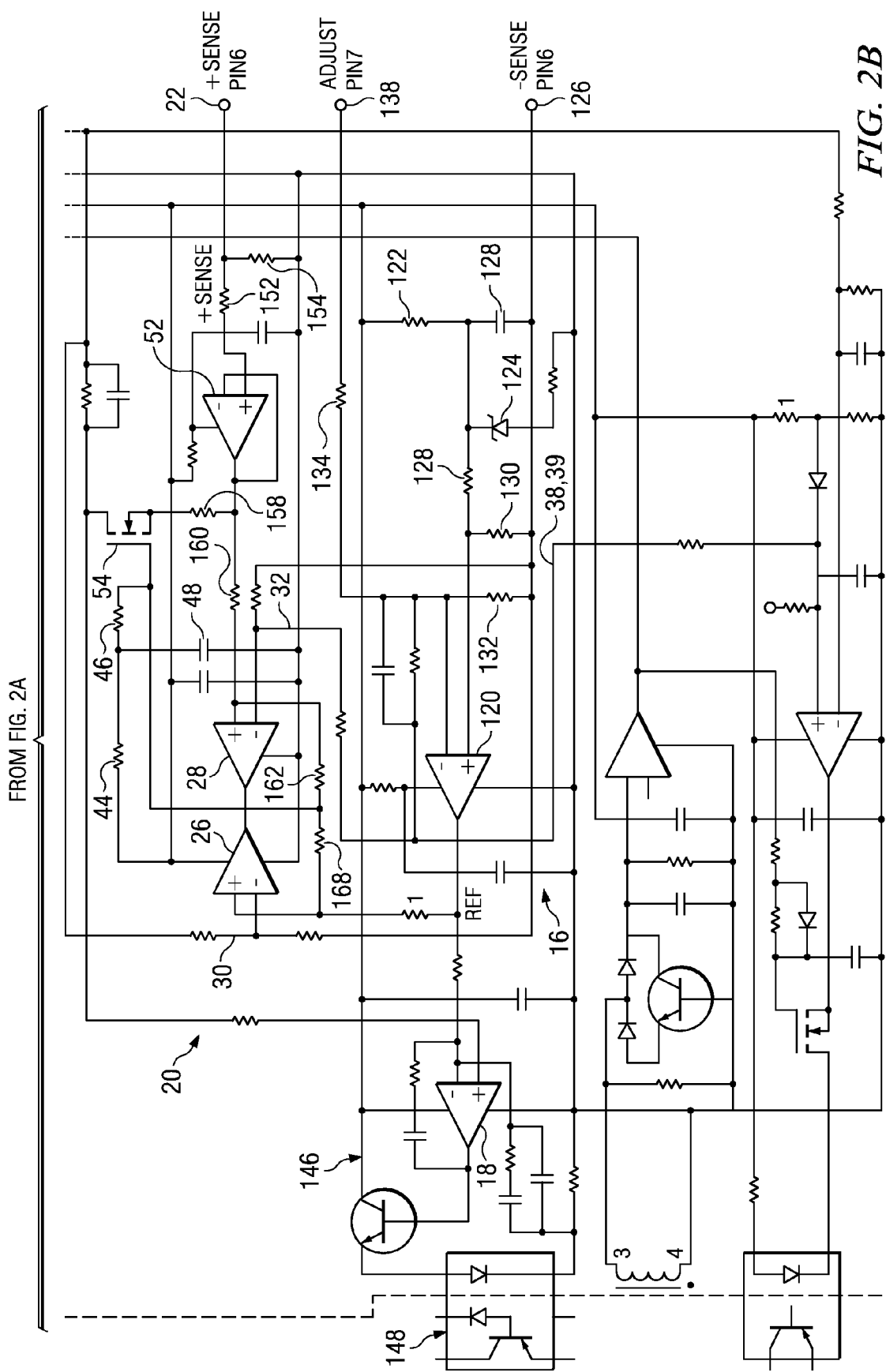

It is certified that error appears in the above-identified patent and that said Letters Patent is hereby corrected as shown below:

Drawing Sheets 3 of 6 and 4 of 6 of the drawings are replaced by the attached replacement Drawing sheets 3 of 6 and 4 of 6 of the drawings (pages 2 and 3 hereof), which include the following changes:

FIG. 2A, change ground symbols (inverted triangles) to heatsink symbols (upside-down flags).
FIG. 2A, add connection line tie dots to connection at element 66, to connection adjacent +VOUT node 10, and at lower terminal of resistor element 104.
FIG. 2A, reverse cathode and anode ends of diode in element 100.
FIG. 2B, add connection line tie dots between elements 26 & 28, at output of element 120, at upper terminal of middle capacitor at bottom of FIG. 2B, and at lower terminal of element 124.
FIG. 2B, connection lines added at top of element 28, at bottom of element 52, at top of amplifier element located below element 120.
FIG. 2B, delete numeral "1" from resistor above REF node and from middle resistor below element 124.
FIG. 2B, change arrow directions to change PNP transistors on left side of drawing to NPN transistors.

Signed and Sealed this

Ninth Day of June, 2009

JOHN DOLL
*Acting Director of the United States Patent and Trademark Office*